United States Patent
Schimpe

(10) Patent No.: US 8,699,877 B2
(45) Date of Patent: Apr. 15, 2014

(54) WAVELENGTH DIVISION MULTIPLEX TERMINAL WITH AUTOMATIC CONFIGURATION AND SUPERVISION OF SWITCH CONNECTIONS

(75) Inventor: Robert Schimpe, Ottobrunn (DE)

(73) Assignee: Xieon Networks S.a.r.l., Luxemburg (LU)

( * ) Notice: Subject to any disclaimer, the term of this patent is extended or adjusted under 35 U.S.C. 154(b) by 303 days.

(21) Appl. No.: 13/000,143

(22) PCT Filed: Jun. 19, 2008

(86) PCT No.: PCT/EP2008/057787
§ 371 (c)(1),
(2), (4) Date: Mar. 14, 2011

(87) PCT Pub. No.: WO2009/152860
PCT Pub. Date: Dec. 23, 2009

(65) Prior Publication Data
US 2011/0188853 A1    Aug. 4, 2011

(51) Int. Cl.
*H04B 10/20* (2011.01)
*H04B 10/08* (2011.01)
*H04J 14/02* (2006.01)

(52) U.S. Cl.
USPC .................. 398/38; 398/43; 398/44; 398/48; 398/50; 398/9; 398/25

(58) Field of Classification Search
USPC ......................................... 398/38, 45, 50, 48
See application file for complete search history.

(56) References Cited

U.S. PATENT DOCUMENTS

| | | | | |
|---|---|---|---|---|
| 7,151,893 B2 * | 12/2006 | Hayashi et al. | .................... | 398/7 |
| 7,200,329 B2 | 4/2007 | Lee et al. | | |
| 7,308,197 B1 * | 12/2007 | Zhong et al. | .................... | 398/48 |
| 7,447,397 B1 * | 11/2008 | Maki et al. | ....................... | 385/17 |
| 7,813,640 B2 | 10/2010 | Amemiya et al. | | |
| 8,229,300 B2 * | 7/2012 | Bogoni et al. | ................... | 398/45 |
| 2002/0171889 A1 | 11/2002 | Takeuchi et al. | | |
| 2003/0039433 A1 * | 2/2003 | Eng et al. | ......................... | 385/24 |
| 2004/0234194 A1 * | 11/2004 | Persson | ............................ | 385/24 |
| 2006/0034610 A1 * | 2/2006 | Akiyama et al. | ................ | 398/83 |
| 2009/0232497 A1 * | 9/2009 | Archambault et al. | ......... | 398/50 |

FOREIGN PATENT DOCUMENTS

EP    1445976 A2    8/2004
EP    1583390 A2    10/2005

* cited by examiner

*Primary Examiner* — Oommen Jacob
(74) *Attorney, Agent, or Firm* — Nelson Mullins Riley & Scarborough LLP

(57) ABSTRACT

A wavelength division multiplexer terminal with a multiplexer arrangement with a first switching matrix, and a demultiplexer arrangement with a second switching matrix allows flexibility for connection transceivers to ports of the wavelength division multiplexer and wavelength division demultiplexer respectively. Optical monitoring receivers are connected upstream the wavelength division multiplexer and downstream the wavelength division demultiplexer for managing and supervising connections.

18 Claims, 6 Drawing Sheets

WAVELENGTH DIVISION MULTIPLEX TERMINAL WITH AUTOMATIC CONFIGURATION AND SUPERVISION OF SWITCH CONNECTIONS

FIELD OF THE INVENTION

The invention refers to a wavelength division multiplex terminal with automatic configuration and supervision of switch connections.

BACKGROUND OF THE INVENTION

Wavelength division multiplexers combine optical signals having different wavelengths and output a wavelength division multiplex signal (WDM-signal). Wavelength division demultiplexers divide a wavelength division multiplex signal into a plurality of optical signals having different wavelengths. Both, multiplexers and demultiplexers, are fixed wavelength band-pass filters. Transceivers (transmitters and receivers) are connected to terminal points of said multiplexers and demultiplexers. Each transmitter (part of the transceiver) emits and each receiver (part of the transceiver) receives an optical signal with a certain wavelength. Each transceiver is connected to certain ports of the terminal, which means that new interconnections are necessary if the number of transceivers is upgraded or new connections between ports and receivers are necessary. Several transceivers can be attached as front ends to an electrical switching matrix.

OBJECTS AND SUMMARY OF THE INVENTION

It is an object of the invention to improve the flexibility of a wavelength division multiplex terminal and to supervise ports and switch connections.

These problems are solved by the features as claimed.

Additional advantageously features are described in dependent claims.

For reasons of flexibility transceivers are connected via a first switching matrix with inputs of a wavelength division multiplexer and via a second switching matrix with outputs of a wavelength division demultiplexer. For supervision of the connections it is advantageously to connect optical monitoring receivers to inputs of the wavelength division multiplexer respectively outputs of a first switch matrix to receive identification signals for routing transmitter signals to selected ports of the wavelength division multiplexer. An equipment management unit receiving identification information from the optical monitoring receivers identifications the switch matrix. The same identification signals or (similar) supervision signals can be used to supervise the switch connections. If the output signal frequencies of the transceivers are tuneable maximum flexibility of connections is ensured.

A complete duplex connection can be supervised if the transmitting and the receiving side are monitored. The second switching matrix assigned to the wavelength division demultiplexer can be managed either by identification signals output from the associated transceivers or by received identification signals emitted from a remote terminal. In this case the identification signals are monitored in a down-stream/demultiplexing path, preferable downstream at the outputs of the second switch matrix.

For design reasons an interleaver and a deinterleaver can be used in the multiplexing respectively demultiplexing arrangement. Then multiplexers and demultiplexers with broader filters can be used.

Power splitters and power combiners or further switch matrices can be used at the inputs and outputs of multiplexers and demultiplexers, respectively, in order to realize bidirectional steering of transponder signals and supervision of their interconnections to the terminals.

BRIEF DESCRIPTION OF THE DRAWINGS

The invention will be explained in more detail in conjunction with the appended drawings, wherein.

DESCRIPTION OF PREFERRED EMBODIMENTS

Figure 1:
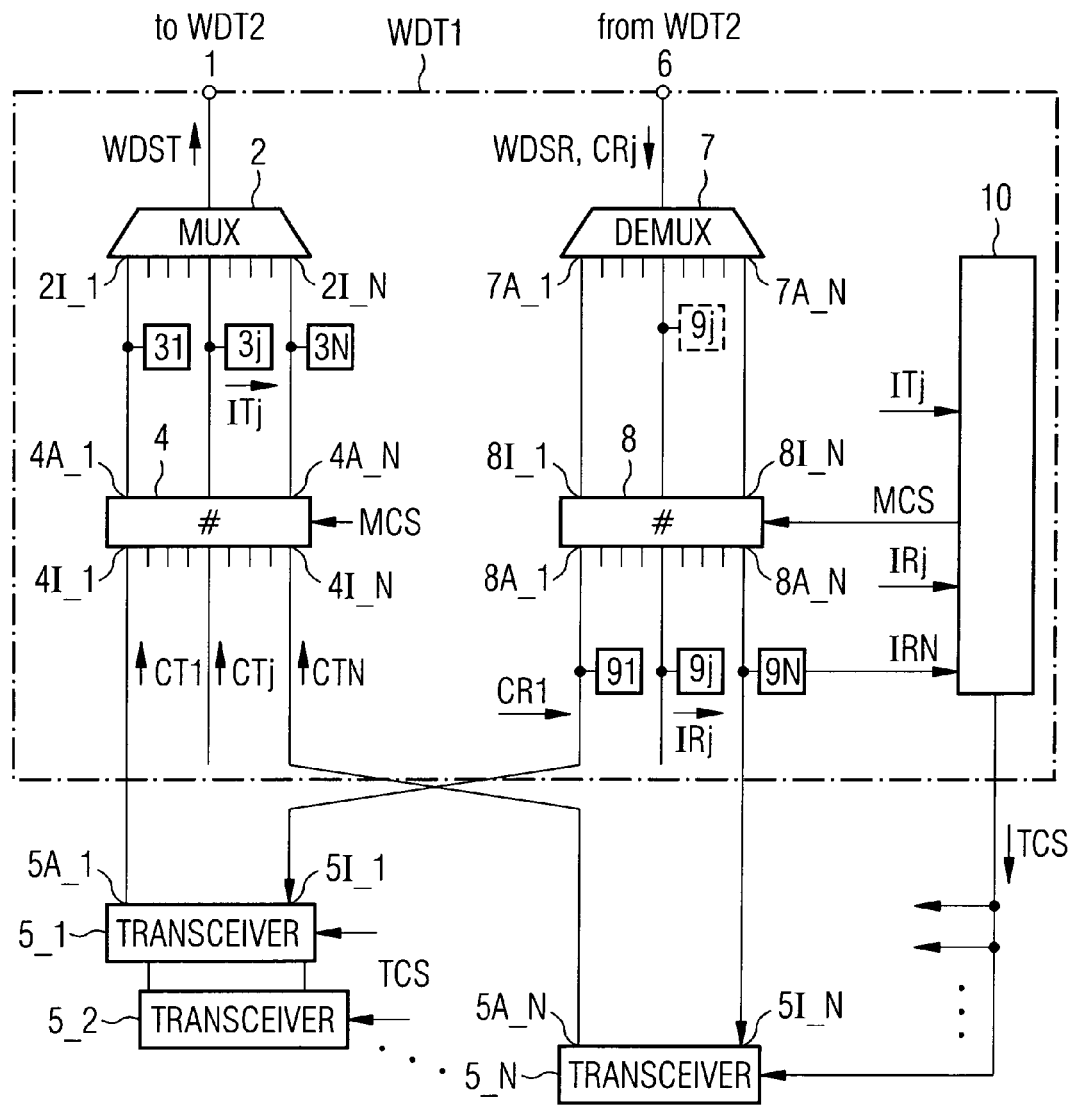
FIG. 1 shows a simplified block diagram of a preferred first embodiment of the invention.

The simplified block diagram of FIG. 1 illustrates a first wavelength division multiplex terminal (WDM terminal) WDT1 with a multiplexing arrangement 4, 3$j$, 2 ($j$=1–N) in an upstream path and a demultiplexing arrangement 7, 8, 9$j$ in a downstream path. Ordinary elements used in the terminal like amplifiers, dispersion compensators are not illustrated.

The multiplexing arrangement comprises a first switching matrix 4, whose input ports 4I_1-4I_N are connected to outputs 5A_1-5A_N of N transceivers 5_1-5_N (or less or even more transceivers according to the expansion stage). Output ports 4A_1-4A_N of the first switching matrix are connected to input terminals 2I_1-2I_N of a wavelength division multiplexer 2 (MUX), which combines optical input signals to a WDM signal WDST.

One or several first identification signals CT1-CTN are output-controlled by an equipment management unit 10 by transceiver control signals TCS—from one or several transceivers 5_1-5_N in a form of modulated light e.g. with on-off keying.

Optical monitoring receivers 31-3N are connected (via not shown splitters) to the output ports 4A_1-4A_N of the first switching matrix 4 via splitters (not shown) or—physically the same—to input terminals 2I_1-2I_N of the wavelength division multiplexer 2.

The monitoring receivers operate essentially wavelength independent, so that each first identification signal output by a transceiver is received by one of the monitoring receivers according to a switch position of the first switching matrix 4. This monitoring receiver 3$j$, ($j$=1–N) receives the first identification signal CT$j$ ($j$=1–N) and converts it into first identification information IT$j$ (in the simplest case into an electrical signal without changing the information), which is fed to the equipment management unit 10. The first identification signal CT$j$ and the identification information IT$j$ includes an equipment number of the transceiver, the shelf and slot position, the frequency of the transceiver or equivalent information. It can e.g. also contain the required input port of the wavelength division multiplexer 2 or the correct switch position.

The management unit 10 converts the first identification signal respectively the first identification information first into port information and than into a correct switch position, configures the connections of the first switching matrix by transceiver control signals TCS and routes the transceiver signals to the associated input terminals of the wave-length division multiplexer 2 (and as will be described later, the received signals from the demultiplexer to the transceiver). It is always necessary that an optical signal with a certain wavelength is input at the associated input of the multiplexer 2.

After an appropriate setting of the first switching matrix 4 the equipment management unit 10 supervises the connections of the first switching matrix 4 by monitoring additional identification signals CTj or corresponding supervising signals. This can be done step by step after each setting.

The first WDM terminal WDT1 is bidirectional connected to a remote WDM terminal WDT2, which transmits a second WDM signal WDSR to the demultiplexing arrangement of the first WDM terminal WDT1.

The demultiplexing arrangement comprises a wavelength division demultiplexer 7 (DEMUX), which receives at an input 6 an optical WDM-signal WDSR. The outputs 7A_1-7A_N of the demultiplexer 7 are individually connected to input ports 8I_1-8I_N of a second switch matrix 8. Output ports 8A_1-8A_N of the second switch matrix 8 are individually connected to inputs 5I_1-5I_N of the transceivers 51-5N.

The switching matrices 4 and 8 can also be realized within one single switching matrix with the double amount of input and output ports.

There are two possibilities of controlling the second switching matrix 8.

The second switching matrix 8, which is routing the received signals, is directly controlled according the first identification signals CTj emitted by the transceivers.

The second switching matrix 8 is controlled according the received second identification signals CRj emitted from the second WDM terminal WDT2.

In a first embodiment, the equipment management unit 10 of the WDM terminal WDT1 controls the first switching matrix 4 and the second switching matrix 8 according to the first identification signals CTj, which are converted into matrix control signals MCS and fed to the switching matrices 4 and 8.

According to a second embodiment, the second switching matrix 8 is controlled according to second identification signals CRj emitted from a transceiver of the second wavelength division terminal WDT2. After setting the switch position of the first switching matrix 4, the identification signals CTj can be transmitted to the remote wavelength division terminal WDT2 via the data channel or via a separate information path (e.g. optical supervisory channel).

The second identification signals CR1-CRN are received by the second WDM terminal WDT2. The received identification signals CRj (and supervision signals) are converted into identification information IRj and used for setting the sec- and switching matrix 8 and/or supervision of the connections. In this case both management units and both identification signals are involved to build up the bidirectional connection. Therefore the managements units of both terminals are bidirectional connected with each other to exchange control information.

There are several additional variations and possibilities to supervise the function of the demultiplexing arrangement:

The output ports of the demultiplexer 7 are supervised.
The output ports of the second switching matrix 8 are supervised.
Only the presence of a signal, that means the correct wavelength, is supervised by the transceivers or by monitoring receivers.

The second switching matrices 4 and 8 are supervised by the management unit 10 varying (modulating) the attenuation of variable optical attenuators, VOAs, with a further identification signal or even by on-off-switching. Therefore it is advantageously to have variable optical attenuators, VOAs, at the inputs especially of the sec- and switching matrix or even having VOAs integrated in the switching matrices. The information imposed onto the modulation can be derived from the identification signals CT1-CTN or CR1-CRN or can be generated by the management unit.

The supervision can also be done by the transceivers (at least the optical-electrical converters can be used).

Additional monitoring receivers 9j, j=1–N can be connected to the input ports of the second switching matrix 8. But then is a supervision of the second switching matrix 8 not possible.

In a preferred embodiment of the invention, the additional monitoring receivers 9j-9N are connected to output ports 8A_1-8A_N of the second switching matrix 8. The second identification signals CRj are converted into "second identification information" IRj and also fed to the management unit 10.

For the management of the second switching matrix 8 by the second identification signals CRj it is necessary that the systems are identical or have sufficient information about the other WDM terminal.

Only the supervision of the received second identification signals CRj, which contain information from the signal emitting transceivers of the second multiplexer terminals WDT2 (at least the wavelength), at the output ports of the second switching matrix 8 ensures that the connections in both WDM terminals WDT1 and WDT2 are correct. Of course, the presence and power level of the transmitted and received signals are also monitored.

Figure 2:
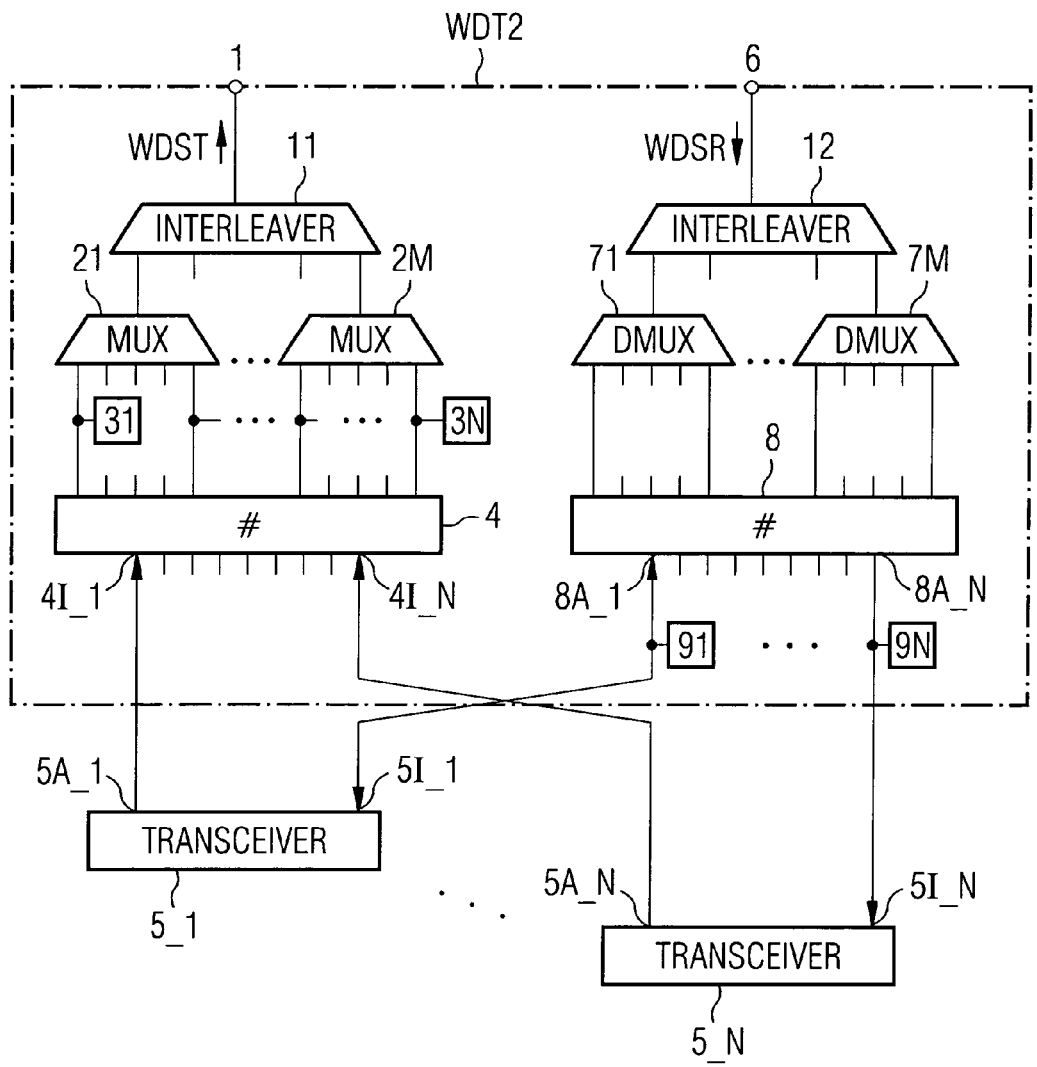
FIG. 2 shows a second block diagram of a second WDM terminal comprising an interleaver and a deinterleaver.

FIG. 2 shows simplified block diagram of a second embodiment of a wavelength division terminal WDT2 comprising an interleaver 11 and a deinterleaver 12.

The multiplexing arrangement comprises wavelength division multiplexers 21-2M, M=2, 4, 6, ... whose outputs are connected to M inputs of the interleaver 11.

The demultiplexer arrangement comprises wavelength division demultiplexers 71-7M, M=2, 4, 6, ... whose inputs are connected to M outputs of the deinterleaver 12.

This embodiment has the advantage that multiplexers and demultiplexers with broader filters can be used.

The management unit is not shown, but its function is identical with the function of the embodiment described before.

Figure 3:
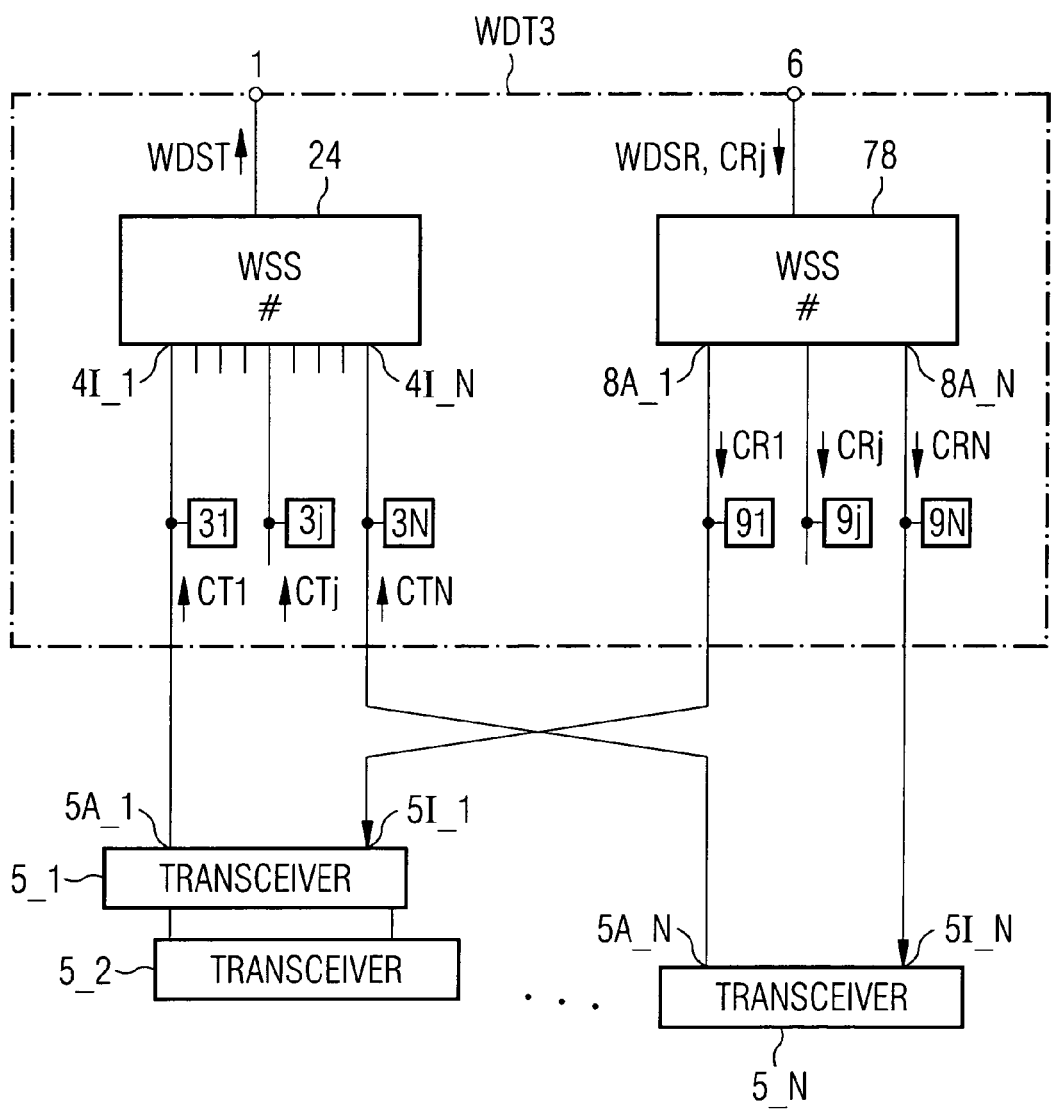
FIG. 3 shows a block diagram of a third WDM terminal comprising wavelength selective switches.

FIG. 3 shows a simplified block diagram of a third embodiment of a wavelength division terminal WDT3 comprising including wavelength selective switches (WSS) 24 and 78, each WSS is replacing a multiplexer/demultiplexer and a switching matrix. The function is identically. The disadvantage of the known WSSs is that there is no possibility to branch of signals between the "switching matrix" and the "multiplexer". Therefore for the monitors have to be arrayed at the inputs of the WSS 24. The function of the WSS 24 in the upstream/multiplexing path can only be checked indirectly by supervising—e.g. in a loop—the received identification signals CRj. Another possibility is a monitoring receiver with spectrum analyser features connected to an output of the WSS 24.

Figure 4:
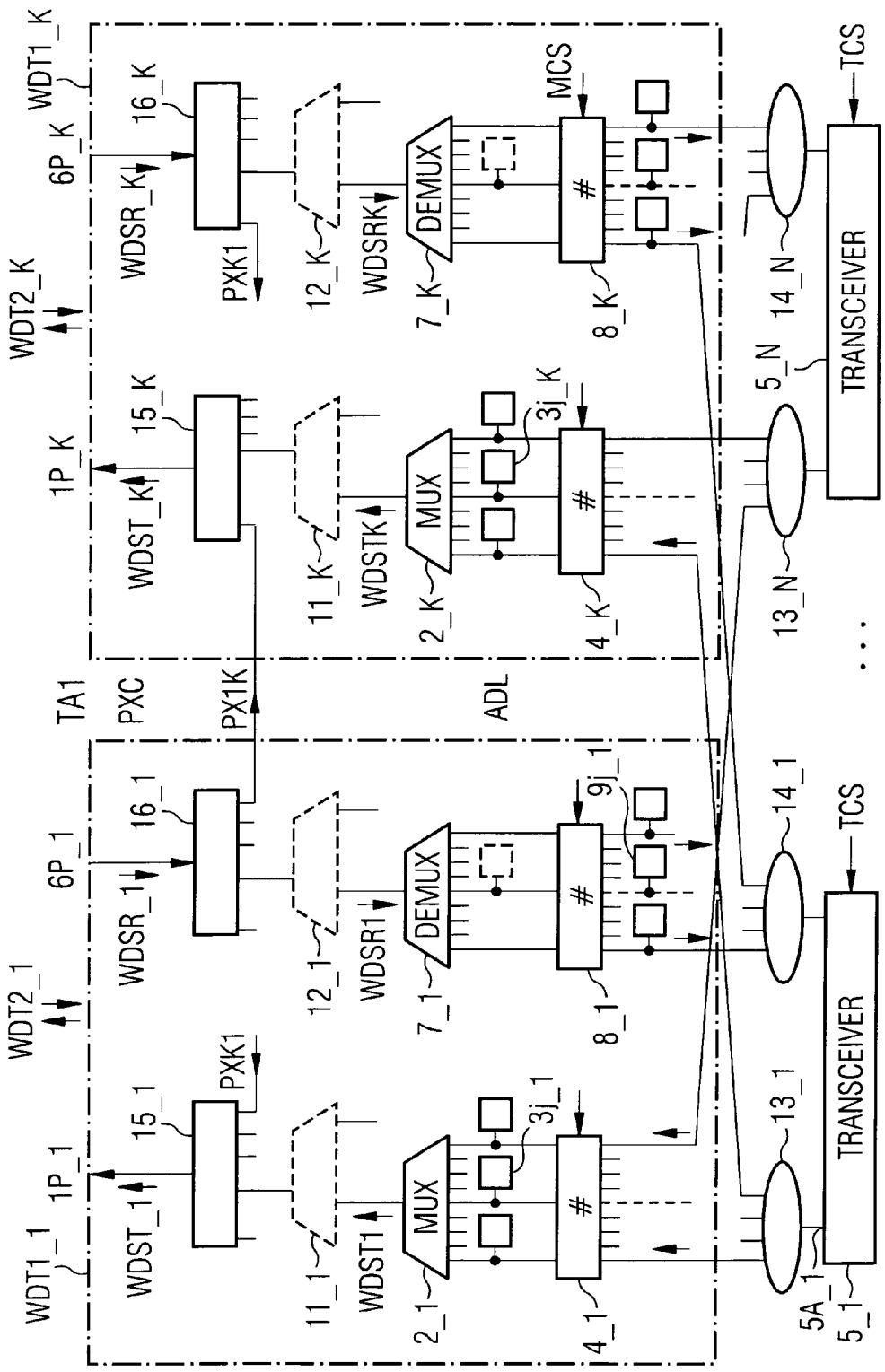
FIG. 4 shows a third block diagram of an terminal arrangement comprising a plurality of wavelength division multiplex terminals.

FIG. 4 shows a simplified block diagram of a terminal arrangement TA1 comprising a plurality of first wavelength division multiplex terminals WDT1_1-WDT1_K with additional switching capability between the terminals in a PXC (Photonic Cross Connect) layer enabled by first and second wavelength selective switches 15_1-15_K and 16_1-16_K respectively.

The WDM terminals comprise, as described before, in their multiplexing paths a first switching matrix 4_1-4_K, a multiplexer 2_1-2_K, and in addition a first wavelength selective PXC (Photonic X (X=Cross) Connect) switch 15_1-15_K. Added signals can be fed from outputs of transceivers 5_1-5_N via additional first switches/splitters 13_1-13_N to first switching matrices 4_1-4_K.

The WDM terminals comprise in their demultiplexing paths a second wavelength selective PXC switch 16_1-16_K, a demultiplexer 7_1-7_K, and a second switching matrix 8_1-8_K. Dropped signals are fed from the PXC WS switches 16_1-16_K via demultiplexers 7_1-7_K and via second switching matrices 8_1-8_K and second switches/combiners 14_1-14_N to inputs of the transceivers 5_1-5_N (a variable number of transceivers, in this example N transceivers, can be connected to a variable number of the terminals). The PCX WSS switches can be replaced by splitters/combiners.

The first WDM terminals WDT1_1-WDT1_K of the shown arrangement are connected via the PXC WSS 15_1-15_K and 16_1-16_K with remote WDM terminals WDT2_1-WDT2_K. The signals of a WDM signal, e.g. WDST1, output from a multiplexer 2_1 are combined with other signals of the other WDM signals WDST2-WDSTK and transmitted as a WDM signal WDST_1. All together the WDM signals WDST_1-WDST_K are transmitted via outputs 1P_1-1P_K of the first PCX WS switches 15_1-15_K. Each WDM signal WDRS_1-WDRS_K is received via inputs 6P_1-6P_K of second PCX WS switches 16_1-16_K (or a splitter/combiner instead of a switch). Selected and dropped WDM signals WDSR1-WDSRK are fed to allocated demultiplexers 7_1-7-K. Further outputs of the PXC WSSs 16_1-16_K in the demultiplexing paths 16_1-16_K are connected via connections (e.g. fibers) PX1K, PXK1, . . . to allocated inputs of the first PXC WS switches 15_1-15_K in the multiplexing paths to enable photonic cross connections (only two connections are illustrated).

The multiplexers and demultiplexers in an add drop logic ADL are connected to the switching matrices in a way described above, but switches/splitters and switches/combiners are inserted between the switching matrices and the transceivers.

Regarding the first WDM terminal WDT1_1 an input of at least one first switch/splitter 13_1 is connected to the output 5A_1 of the first transceiver 5_1, and an output of at least one second switch/combiner 14_1 is connected to the input 5I_1 of this transceiver. Additional outputs of the first switches/splitters 13_1 are connected to input ports of the first switching matrices 4_1-4_K of the other first WDTs WDT1_2-WDT1_K (or of only a limited number of them, e.g. 2 or 3); and additional inputs of the second switches/combiners 14_1-14_N are connected to output ports of the second switching matrices 8_1-8_K of the other first WDTs WDT1_2-WDT1_K (or of only a limited number of them, e.g. 2 or 3). For a sufficient protection it is advantageously if all inputs and all outputs of all transceivers 5_1-5_N are connected via first switches/splitters 13_1-13_N or second switches/combiners 14_1-14_N to at least first WDM terminals WDT1_1-WDT1_K.

The first switch 13_1 and the second switch 14_1 can also be combined in one switch matrix.

Of course, the terminal arrangement can also be assembled by the embodiments of FIG. 2 or FIG. 3.

The management unit 10 again is not shown, but the function is similar with the embodiment described before, but connectivity of more than one WD terminal can be managed and supervised.

Figure 5:
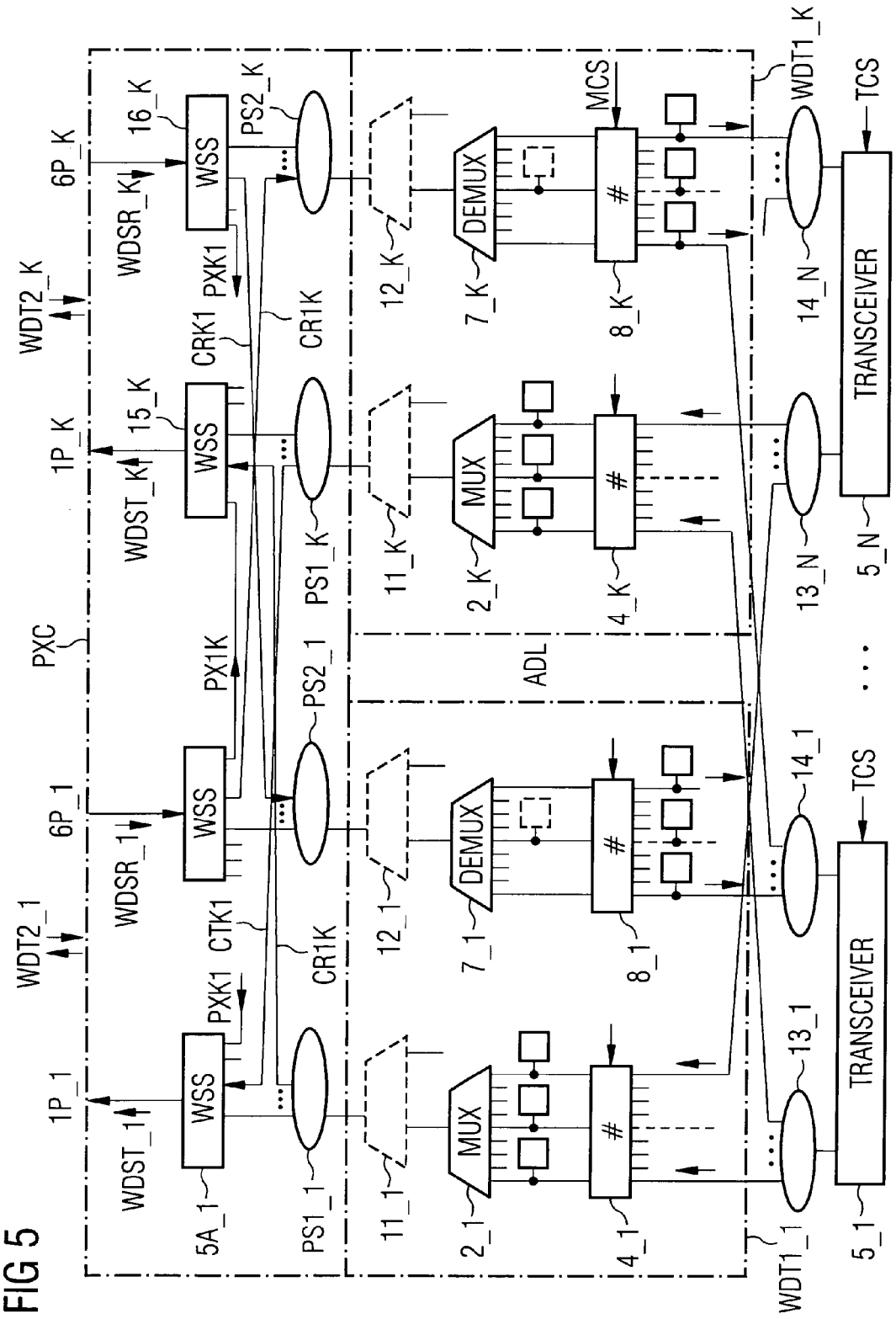
FIG. 5 shows a block diagram of this terminal arrangement comprising an improved photonic switching ability.

FIG. 5 shows the arrangement with an extended photonic cross connect PXC. Additional splitters PS1_1-PSK_K are inserted between the outputs of the multiplexers 2_1-2_K (or interleavers 11_1-11_K) and the WSSs 15_1-15. At least one output of the additional splitters is connected to at least an input of a second multiplexer. Additional combiners PS2_1-PS2_K are inserted between the WSSs 16_1-16_K and the demultiplexers 7_1-7_K (or the deinterleavers 12_1-12_K). At least one inputs of the additional combiners is connected to an output of an other demultiplexer.

This arrangement enables cross connections between output WDM signals via connections CT1K, CTK1, . . . or between signals output from the WSSs 16_1-16_K via connections CR1K, CRK1, while the PXC connections PX1K-PXK1 described before allow PXC connections between received and transmitted signals.

Figure 6:
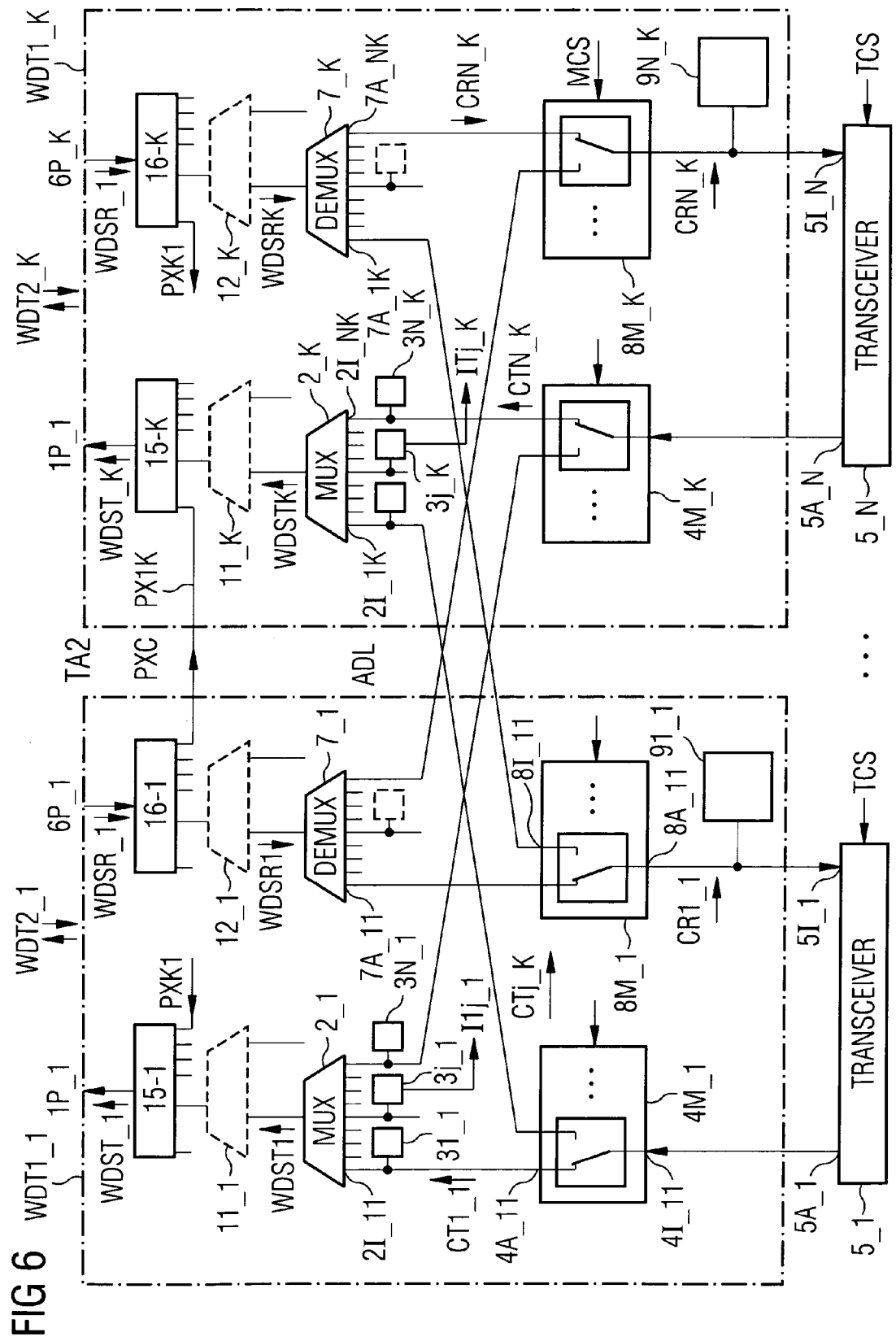
FIG. 6 shows a block diagram of an second terminal arrangement comprising multiplexer and demultiplexer switching matrices.

FIG. 6 shows a simplified block diagram of second terminal arrangement TA2 with restricted switching capability. A first multiplexer matrix 4M_1 is connecting an output 5A_1 of the first transceiver 5_1 to all first inputs 2I_11-2I_1K of the multiplexers 2_1-2_K; and the outputs of the other transceivers 5_2-5_N are connected in a corresponding way via multiplexer matrices 4M_2 (not shown)-4M_K to further inputs of the multiplexers 2_1-2_K. The multiplexer matrix 4M_1 needs only N inputs and N×K outputs (only the transceivers 5_1 and 5_N and their connections are shown for reasons of clarity). In a corresponding manner are all first outputs 7A_11-7A_1K of the demultiplexers 7_1-7_K connectable via demultiplexer matrices 8M_1-8M_K to the input of the first transceiver 5_1; and in a corresponding way all the other outputs of the demultiplexers 7_1-7_K to the inputs of the other transceivers.

The switches of the multiplexer matrix and the demultiplexer matrix allocated to a WDM terminal can be also arranged in a single chip; also all switches can be designed in a larger chip and allocated to e.g. a connection board.

If the output and input wavelength of the transceivers are selectable or tuneable, this is a low cost but embodiment with good switching possibilities.

Of course a common switching matrix which allows connections between all inputs and all outputs may be available in the future and can replace the shown matrices. This common switching matrix will also replace the combination of splitters 13_1-13_N, 14_1-14_N and matrices 4_1_4_K, 8_1-8_K shown in FIG. 4.

A combination with a photonic cross connect as described before is also possible.

The management unit 10 again is not shown, but the function is similar with the embodiment described before, but connectivity of more than one terminal can be managed and super-wised.

REFERENCE SIGNS

WDT1 first wavelength division multiplex terminal
WDT2 remote second wavelength division multiplex terminal
WDT1_1-WDT1_K first and at least second wavelength di vision terminal
WDT2_1-WDT2_K first and at least second remote wave length division terminal WDST transmitted WDM signal
WDSR received WDM signal
1 multiplexer output
1_1-1_K outputs of the WDT1s
2 wavelength division multiplexer
2I_1-2I_N inputs of the wavelength division multiplexer
21-2M wavelength division multiplexer
M number of interleaver outputs
2_1-2_K first to K$^{th}$ multiplexer in K WDT1s
3j monitoring receivers
3j_1-3j_K monitoring receivers
4 first switching matrix
4I_1-4I_N input ports of the first switching matrix
4A_1-4A_N output ports of the first switching matrix
4_1-4_K first switching matrices
4D_1-4D_N multiplexer switching matrix
5 transceivers
N number of channels
5I_1-5I_N inputs of the transceivers
5A_1-5A_N outputs of the transceivers
6 demultiplexer input
6-1-6_K inputs of the WDT1s
K number of WDT1s
7 wavelength division demultiplexer
7A_1-7A_N outputs of the wavelength division demultiplexer
71-7M wavelength division demultiplexer
8 second switching matrix
8I_1-8I_N input ports of the second switching matrix
8A_1-8A_N output ports of the second switching matrix
8_1-8_K second switching matrices
8M_1-8M_N demultiplexer switching matrix
9j additional monitoring receivers
9j_1-9j_K additional monitoring receivers
10 equipment managing unit
MCS matrix control signal
TCS transceiver control signal
11 interleaver
12 deinterleaver
11_1-11_K interleaver
12_1-12_K deinterleaver
13_1-13_N switches/splitters
14_1-14_N switches/combiners
15_1-15_K first PXC WSS (transmitter)
16_1-16_K second PXC WSS (receiver)
PXC photonic cross connect
ADL add-drop logic
CT1-CTN transmitted identification signal
CR1-CRN received identification signal
IT1-ITN transmitted identification information
IR1-IRN received identification information
PS1_1 PXC splitter
PS2_1 PXC combiner
PX1K WSS connection 1-K
CR1K combiner connection 1-K
CT1K splitter connection 1-K
PS2_1 splitter in PXC

The invention claimed is:

1. A wavelength division multiplex terminal for automatic configuration and supervision of switch connections, the wavelength division multiplex terminal comprising:
  a multiplexer arrangement receiving optical signals from a plurality of transceivers and transmitting a first wavelength division multiplex signal;
  a first switching matrix having input ports connected to outputs of the transceivers and output ports;
  a wavelength division multiplexer having inputs connected to said output ports of said first switching matrix;
  a plurality of wavelength independent optical monitoring receivers each connected to an output port of said first switching matrix, said optical monitoring receivers being configured for receiving first identification signals output from the transceivers and outputting first identification information; and
  a management unit connected to receive the first identification information from said optical monitoring receivers, said management unit being configured for connecting outputs of the transceivers via said first switching matrix to said inputs of said wavelength division multiplexer according to the first identification signals and supervising the connections of said multiplexer arrangement according to first supervising signals or the first identification signals output from the transceiver.

2. A wavelength division multiplex terminal for automatic configuration and supervision of switch connections, the wavelength division multiplex terminal comprising:
  a multiplexer arrangement receiving signals from a plurality of transceivers and transmitting a first wavelength division multiplex signal;
  a first switching matrix having input ports connectable to outputs of the transceivers and output ports;
  a wavelength division multiplexer having inputs connectable to said output ports of said first switching matrix;
  a plurality of wavelength independent optical monitoring receivers each connected to an output port of said first switching matrix, said optical monitoring receivers being configured for receiving first identification signals from the transceivers and outputting first identification information;
  a demultiplexer arrangement including a wavelength division demultiplexer for receiving a second wavelength division multiplex signal from a remote wavelength division multiplex terminal;
  a second switching matrix having input ports connected to outputs of said wavelength division demultiplexer, and output ports connectable to inputs of the transceivers;
  a plurality of wavelength independent optical monitoring receivers each connected to an output port of said second switching matrix, said optical monitoring receivers being configured for receiving the first identification signals from the transceivers and outputting the first identification information; and
  a management unit connected to receive the first identification information from said optical monitoring receivers, said management unit being configured for connecting outputs of the transceivers via said first switching matrix to said inputs of said wavelength division multiplexer according to the first identification information output from the optical receivers;
  wherein said management unit is additionally configured for supervising the connections of said multiplexer arrangement according to the first identification signals or the first identification information derived from the first identification signals received via the remote wavelength division multiplex terminal, and additionally controlling and supervising connections of the demultiplexer arrangement according to the first identification information.

3. The terminal according to claim 1, comprising:
  a demultiplexer arrangement including a wavelength division demultiplexer for receiving a second wavelength division multiplex signal from a remote wavelength division terminal;

a second switching matrix having input ports connected to outputs of said wavelength division demultiplexer and output ports connectable to inputs of said transceivers;

additional optical monitoring receivers connected to output ports of said second switching matrix and configured for receiving second identification signals from said remote wavelength division terminal, and outputting received identification information; and wherein said management system is additionally configured for controlling the connections of the demultiplexer arrangement according to the received second identification signals and/or for supervising the connections according to the received second identification signals or second supervising signals emitted from said remote wavelength division terminal.

4. The terminal according to claim 1, comprising:

a demultiplexer arrangement including a wavelength division demultiplexer for receiving a second wavelength division multiplex signal;

a second switching matrix having input ports connected to outputs of said wavelength division demultiplexer and output ports connectable to inputs of said transceivers;

additional optical monitoring receivers connected to input ports of said second switching matrix designed for receiving second identification signals from a remote wavelength division terminal and outputting received identification information; and wherein said management unit is additionally configured for controlling said second switching matrix according to received second identification signals and/or for supervising said second switching matrix according to the second identification signals or second supervising signals emitted from the remote wavelength division terminal.

5. The terminal according to claim 2, wherein said optical monitoring receivers and said management unit are additionally configured to supervise presence or power levels of optical signals emitted from said transceivers.

6. The terminal according to claim 2, wherein said switching matrices are capable of varying an attenuation controlled by said management unit.

7. A WDM terminal according to claim 2, which comprises:

an interleaver having a first input connected to an output of a first wavelength division multiplexer and at least one second input connected to an output of at least one second wavelength division multiplexer; and/or a deinterleaver having a first output connected to an input of a first wavelength division demultiplexer and at least one second output connected to an input of at least one second wavelength division demultiplexer.

8. A first terminal arrangement comprising a plurality of wavelength division multiplex terminals according to claim 3, comprising:

first optical switches/splitters having inputs connectable to outputs of said transceivers respectively, and having outputs connectable to input ports of said first switching matrix; and second optical switches/combiners having inputs connected to output ports of said second switching matrix, and having outputs each connectable to respective inputs of said transceivers.

9. The terminal arrangement according to claim 8, which further comprises:

a photonic cross connect inserted between inputs and between outputs of wavelength division multiplex terminals and particularly between said multiplexers outputs and between inputs of said demultiplexer to allow photonic cross connect functionality between different wavelength division multiplex terminals.

10. The terminal arrangement according to claim 9, wherein said photonic cross connect comprises:

first wavelength selective photonic cross connect (PXC) switches inserted in multiplexing paths of the WDM terminals outputting first wavelength division multiplex signals; and second wavelength selective photonic cross connect (PXC) switches inserted in demultiplexing paths of the WDM terminals receiving second wavelength division multiplex signals, of which one output is fed to an allocated demultiplexer dropping a WDM signal, and of which other outputs are connected to inputs of the other first wavelength selective PXC switches.

11. The terminal arrangement according to claim 10, wherein said photonic cross connect comprises:

PXC splitters inserted between said multiplexers and said first wavelength selective PXC switches having additional outputs connected via connections to inputs of the other first wavelength selective PXC switches; and PXC combiners inserted between the second wavelength selective PXC switches and said demultiplexers having additional inputs connected via connections to inputs of the other first wavelength selective PXC switches.

12. The terminal arrangement according to claim 10, wherein said first wavelength selective Photonic Cross Connect (PXC) switches or said second wavelength PXC selective switches are replaced by combiners or splitters respectively.

13. A terminal arrangement for automatic configuration and supervision of switch connections, with a plurality of multiplexer arrangements each receiving optical signals from a plurality of transceivers and transmitting first WDM signals, and comprising a plurality of demultiplexer arrangements each receiving a second WDM signal and distributing received signals to said transceivers, the terminal arrangement comprising:

multiplexer switching matrices having input ports connectable to allocated outputs of the transceivers, and output ports connectable to allocated inputs of wavelength division multiplexers, wherein the multiplexer switching matrices enable connection between transceiver outputs and an allocated input of said wavelength division multiplexers, the wavelength division multiplexers outputting the first WDM signals;

a plurality of wavelength independent optical monitoring receivers, each connected to an input of said wavelength division multiplexers and being configured for receiving identification signals from the transceivers and outputting identification information;

demultiplexer switching matrices having input ports connected to allocated outputs of wavelength division demultiplexers, said wavelength division demultiplexers receiving second WDM signals, and having output ports connectable to allocated inputs of the transceivers, said demultiplexer switching matrices enabling connection between each transceiver input and an allocated output of all said wavelength division demultiplexers;

optical monitoring receivers, each connected to allocated outputs of the wavelength division demultiplexers and outputting identification information;

a management unit connected to receive the identification information from said optical monitoring receivers, said management unit being configured for connecting outputs of the transceivers via said multiplexer switching matrices to the inputs of the wavelength division multiplexers according to the identification signals and supervising the connections according to supervising signals or the identification signals output from the transceiver.

14. The arrangement according to claim 13, further comprising:
   additional optical monitoring receivers connected to output ports of said demultiplexer switching matrices receiving second identification signals from a remote wavelength division terminal; and
   said management system being additionally configured for controlling and/or supervising said demultiplexer switching matrices according to received identification signals or supervising signals emitted from the remote wavelength division terminal.

15. The arrangement according to claim 13, wherein at least one multiplexer switching matrix and at least one demultiplexer switching matrix are combined to form one switching matrix.

16. The terminal arrangement according to claim 13, which comprises:
   a photonic cross connect inserted between inputs and between outputs of said wavelength division multiplex terminals and, particularly, between said multiplexers outputs and between said demultiplexers inputs to allow photonic cross connect functionality between different wavelength division multiplex terminals.

17. A wavelength division multiplex terminal for automatic configuration and supervision of switch connections, the wavelength division multiplex terminal comprising:
   a multiplexer arrangement receiving optical signals from a plurality of transceivers and transmitting a first wavelength division multiplex signal;
   a first wavelengths selective switch having input ports connected to outputs of the transceivers;
   a plurality of wavelength independent optical monitoring receivers each connected to an input port of said first wavelengths selective switch, said optical monitoring receivers being configured for receiving first identification signals output from the transceivers and outputting first identification information;
   a management unit connected to receive the first identification information from said optical monitoring receivers, said management unit being configured for connecting outputs of the transceivers to said input ports of said first wavelengths selective switch according to the first identification signals and supervising the connections of said multiplexer arrangement according to first supervising signals or the first identification signals output from the transceiver.

18. The terminal of claim 17, further comprising:
   a demultiplexer arrangement including a second wavelength selective switch for receiving a second wavelength division multiplex signal from a remote wavelength division terminal;
   additional optical monitoring receivers connected to output ports of said second wavelength selective switch and configured for receiving second identification signals from said remote wavelength division terminal, and outputting received identification information; and
   wherein said management system is additionally configured for controlling the connections of the demultiplexer arrangement according to the received second identification signals and/or for supervising the connections according to the received second identification signals or second supervising signals emitted from said remote wavelength division terminal.

* * * * *